UNITED STATES PATENT OFFICE 2,351,071

METHOD OF MAKING FEED PRODUCTS

Hermann Henry Schmidt, Hanover, Kans., assignor to The Universal Royalty and Development Company, St. Joseph, Mo., a corporation of Missouri No Drawing. Application October 1, 1941, Serial No. 413,181

13 Claims. (Cl. 99—6)

My invention relates to a method of making a feed product, or similar product, involving dry or green feed material and molasses or a similar coating material.

It is a purpose of my invention to provide a new and improved method of making a feed or similar product, comprising cutting up said material, such as dry stalks, hay, straw, or other fodder or stover, or such stalks, in a semi-dried or fresh condition, in which the material that is to be cut is continuously cut and fed into the spray of coating material, which is centrifugally whirled to break up and finely divide the same and deposit the same on the cut up material to be coated, and continuously drying the coating material after being applied to the solid feed material and continuously feeding the same after drying into suitable containers in which the same can be stored after being dried.

More particularly my method comprises the cutting up of the solid feed material, continuously centrifugally whirling the coating material, such as molasses, or a blend of several kinds of molasses, or a blend of molasses and solid powdered materials, continuously discharging the coating material from a chamber in which the same is whirled in a mist-like fine spray, continuously feeding the cut up feed material into this spray to impregnate or coat the same while agitating the feed material, and continuously conveying the coated feed material away from the spray in contact with air until the coating is dried. In case the solid feed material is dry at the time it is cut, the entire product will be dry when the coating is dried, by conveying the same in contact with air until the coating has completely dried.

There are many advantages to my improved method, among them being the principal one that the method can be used by anyone for making a molasses feed product at relatively small expense without the use of any heat for drying the product, thus avoiding expensive equipment and the danger of fire, the material upon which the molasses is sprayed, or the blend of molasses and other material, is sprayed, being ordinarily highly inflammable, particularly if it is dry. Among the advantages is the fact that the method is of such a simple character that it can be utilized on a farm either for making a molasses feed product that can be stored, by using for the feed material that is to be cut up, dry straw, hay, dry stalks of grain, such as corn, for example, and other parts of corn or similar vegetation, such as leaves, or which can be made into a feed product that must be used within a reasonable period of time, by using the green vegetation, such as green corn stalks and leaves, or similar material. Such material is ordinarily referred to as stover, or fodder, and this term is used herein to designate such relatively coarse feed other than the grains themselves, whether in a dry or a green state, or in a partly dried state.

One of the important advantages of my invention is that the method comprises such centrifugal whirling of the coating material as to so finely divide and break up the same that viscous sticky material, such as molasses, loses most of its stickiness, and instead of remaining sticky and having to be dried by the application of heat thereto, after having been applied to the fodder or stover, will dry upon contact with air for a reasonable period of time and after being conveyed along in contact with the air to a point of sacking, can be sacked and will keep indefinitely and not ferment, if the base material, that is, the stover or fodder, is in a dried condition before the molasses or similar coating material is applied thereto.

My invention further contemplates providing means for adding minerals or other materials to the product to increase the nutritive value thereof or obtain any other desired qualities thereof, by introducing this added finely divided solid material, or added grain or other material, should this be desired, to the mass as it is being agitated and the coating material applied thereto, thus thoroughly blending the added material with the feed product and providing a molasses or similar coating thereon, as well as on the solid feed material that has been previously cut up, if the added material is in particles, while if it is in a powdered form it will blend with the molasses to the extent of forming part of the coating itself and thus is distributed thoroughly throughout the product.

Other objects and advantages of my invention will appear as the description thereof proceeds. I desire to have it understood, however, that I do not intend to limit myself to the particular details described, except as defined in the claims.

In carrying out my improved method, an apparatus similar to that shown in my co-pending application Serial No. 405,962, filed August 8, 1941, is, preferably, utilized and will best carry out my method, although it can be carried out by other apparatus if desired. The dry feed material or other solid feed material, such as corn stalks, and other stalks of grain, leaves, hay, straw, or other solid or coarse feed material, is finely cut up by suitable mechanism into, preferably, rather short lengths, so as to provide a base material for the feed product that can be readily agitated and turned over, so that all portions of the cut up material will be coated as the method proceeds. While the exact size or length of the particles can be varied, these must not be cut so long as to tend to wind up on screw conveying means. The feed material so cut up is, preferably, continuously fed through a suitable hopper, or similar device, onto continuously operating conveying means.

Suitable means for rotatively impelling at high velocity, by continuously feeding and continuously discharging molasses, or a blend of molasses, or a blend of molasses and other material, onto the material that has been previously cut up, may be provided. This is, preferably, done by continuously feeding the molasses, or the blend, into a chamber and rotatively whirling the same therein at a high velocity, to create a centrifugal whirl of the material such that it will be finely divided and broken up and will be sprayed from the chamber under the centrifugal force in a finely divided mist-like condition and with the characteristics of the molasses changed so that it will lose most of its viscosity and stickiness.

While the solid feed material that has been previously cut into proper size is being fed continuously into the spray created in this manner of the molasses, or blend of molasses, or blend of molasses and solid powdered material, the previously cut up feed material is, preferably, continuously agitated in a direction transversely of the direction of movement thereof, due to the conveying means, and also transversely of the direction in which the spray operates that is throwing the molasses at high velocity onto the feed material that forms the base of the product, that is, the agitation is, preferably, in the general direction of the axis of rotation of the central whirl, while the movement of the mass of material is generally perpendicular to this axis, as is also the direction in which the spray discharges from the chamber in which the centrifugal whirling is taking place. Thus a thorough mixture of all the ingredients and a thorough impregnation of all of the solid ingredients with the material sprayed thereon takes place.

If desired, added ingredients, such as powdered mineral matter, or solid material in finely divided form or in particles, such as grain, can be added to the feed product immediately after it has entered the spray and is still being agitated, so that this added material is thoroughly incorporated in the product and is thoroughly sprayed along with the solid material that is cut up before being introduced into the spray. In case finely divided solid material, such as powdered mineral material, is added at this point, it will combine with the material that is being sprayed on the feed material that forms the base of the product, and will blend therewith to a certain extent to form part of the coating.

If a more thorough blend of the molasses and the solid finely divided material is desired than can be obtained in this manner, the molasses and the finely divided powdered material is introduced, either already mixed together or separately, into the chamber in which the centrifugal whirl takes place, to thoroughly blend the molasses and the solid powdered ingredients before being sprayed on the cut up fodder or stover. Instead of blending together a finely divided solid material and molasses in this manner and spraying it on the base material of the feed product, two or more kinds of molasses can be blended together in the desired proportions to get a desired quality of the feed product, and can then be sprayed in blended condition onto the feed product, by the use of centrifugal force created by whirling the molasses in a chamber.

It is, of course, to be understood that the feeding of the solid material that has been previously divided up by cutting, and of the molasses, or the blend, is to be controlled so as to get the desired proportion of the coating material and the base material forming the bulk of the feed product. Also the length of time that the material is being sprayed can be varied by varying the rate at which the dry or solid material is conveyed through the spray of the molasses, or the blend of materials, discharged onto the solid or dry material.

After all of the ingredients have been introduced into the product and sprayed as above described, the sprayed product is carried forward without further agitating the same, so as to be carried along by any suitable conveying means in contact with air for an interval of time sufficient to dry the coating material, and in case the base material is a dry material, the drying of the coating material will produce a completely dry feed product. As soon as the feed product has been conveyed a sufficient distance through the air, to dry the coating, it is immediately passed into a suitable container, or containers, and in case the base material is dry the containers can be for storage of the material for indefinite periods of time, or for shipment to any desired point.

While dry feed material can be coated in this manner by the method described, one of the most desirable uses of my apparatus is the coating of material that has been cut or gathered on the farm right at the point at which the same has been produced, without shipping to any other point, by the farmer himself, by putting the green, or partly green, stalks, or other fodder, or stover, through my improved process, as the stalks, or similar green, or partly green, material can be cut up and treated in substantially the same manner as above described, and a product will be produced that will not sour, due to fermentation of the molasses, but would only spoil due to spoilage of the material that has been coated, if kept too long, and which can be sacked or otherwise put in containers for immediate or near future use on the farm on which the base material for the feed has been grown, thus saving all transportation costs and providing means for the farmer to make his own molasses feed product, or other similar feed product.

This is highly desirable because it saves considerable shipping cost for the farmer to be able to do this, thus cutting down the final cost of the feed for the farmer, and also enables the farmer to use material for feed that would ordinarily not contain suitable or sufficient nutritive ingredients to feed his stock in the proper manner therewith. While molasses can be mixed with other feed materials to enhance the nutritive value thereof in other ways, such mixtures are not uniform and cannot be scientifically prepared so as to get the proper proportions of the various ingredients in all portions of the feed product, without the use of my method. This is particularly true of any feed that contains molasses, because molasses is such a highly viscous material that it is difficult to handle and to blend with other materials in a uniform manner without centrifugally whirling and spraying the same in the manner herein described. If a thorough blend and a fine coating of all the feed material that forms the base of the product is not obtained by the method utilized, then the material has to be prepared in very small quantities, so as to be immediately used to prevent spoiling thereof, and furthermore the material will not be of such a uniform character that all of the animals fed therewith will receive exactly the same food value from the feed, as there will be more molasses in some and less in other portions of the product.

While my improved method is particularly adapted for making molasses feed products, it can also be used for cutting up and finely dividing other solid material that is to be coated with a sticky or viscous or other coating material in a uniform manner throughout the mass of the material in controlled proportions. My method can also be adapted to coating or impregnating any finely divided solid material in a uniform manner throughout its mass, and can be readily adapted for making sweeping compound.

Should it be found desirable to heat the coating material to facilitate feeding it into the chamber in which the whirling takes place, this would not in any manner be harmful to the results produced, as long as the coating material is not heated to an extent that changes in the characteristics thereof, other than merely making it more fluid, take place. Also if it is desired to speed up the drying process by the use of heated air, or other application of heat, this can be done and a much drier product obtained than if other methods of manufacture are used than my improved method. However, if heat is used, or hot air is used, for drying, it is unnecessary to provide such a high heat as to bring about a condition that might cause fire, which would be true with other methods previously used that had to employ heat to dry the feed product.

What I claim is:

1. The method of making a coated product comprising reducing solid material to desired size, simultaneously continuously centrifugally whirling a mobile coating material in a chamber, continuously centrifugally discharging said coating material from said chamber in a fine mist-like spray under the influence of the centrifugal force of said whirl, continuously feeding the freshly reduced solid material into said spray to coat the same, and agitating said reduced material transversely of the direction of said spray and of said feed while in said spray.

2. The method of making a feed product, comprising cutting up solid feed material, simultaneously continuously centrifugally whirling a coating material comprising a blend of a plurality of mobile materials in a chamber, continuously centrifugally discharging said coating material from said chamber in a fine mist-like spray, continuously feeding the freshly cut up feed material into said spray to coat the same, and agitating said feed material transversely of the direction of said spray and of said feed while in said spray.

3. The method of making a feed product, comprising cutting up solid feed material, continuously centrifugally whirling a coating material comprising molasses in a chamber, continuously discharging said coating material from said chamber in a fine mist-like spray radially of said whirl, continuously feeding the cut up feed material into said spray substantially perpendicular to the axis of said whirl to coat the same, agitating said feed material in the general direction of the axis of said whirl while in said spray, and adding a solid ingredient to said feed material during agitation thereof in said spray.

4. The method of making a feed product, comprising cutting up solid feed material, continuously centrifugally spraying a coating material comprising molasses in a fine mist-like spray, continuously feeding the cut up feed material into said spray to coat the same, and agitating said feed material transversely of the direction of feeding thereof while in said spray.

5. The method of making a feed product, comprising continuously centrifugally whirling a coating material comprising molasses in a chamber, continuously discharging said coating material from said chamber in a fine mist-like spray radially of said whirl, continuously feeding particles of solid feed material into said spray substantially perpendicular to the axis of said whirl to coat the same, agitating said feed material in the general direction of the axis of said whirl while in said spray and continuously conveying the coated feed material in contact with air until said coating is dried.

6. The method of making a feed product, comprising continuously centrifugally whirling a coating material comprising molasses in a chamber, continuously discharging said coating material from said chamber in a fine mist-like spray radially of said whirl, continuously feeding particles of solid feed material into said spray substantially perpendicular to the axis of said whirl to coat the same, agitating said feed material in the general direction of the axis of said whirl while in said spray, and adding a solid ingredient to said feed material during agitation thereof in said spray.

7. The method of making a feed product, comprising continuously centrifugally whirling a coating material comprising molasses in a chamber, simultaneously continuously cutting up green feed material into pieces short enough that the same will not wind up on a rotating member, continuously centrifugally discharging said coacting material from said chamber in a fine mist-like spray, continuously feeding the freshly cut up green feed material into said spray to coat the same, agitating said feed material transversely of the direction of said spray and the direction of feed while in said spray and continuously conveying the coated feed material in contact with the atmosphere until the coating is dried.

8. The method of making a feed product, comprising continuously centrifugally whirling a coating material comprising molasses in a chamber, simultaneously continuously cutting up green feed material into pieces short enough that the same will not wind up on a rotating member, continuously centrifugally discharging said coating material from said chamber in a fine mist-like spray, continuously feeding the freshly cut up green feed material into said spray to coat the same, agitating said feed material transversely of the direction of said spray and the direction of feed while in said spray, adding a solid ingredient to said feed material during agitation thereof in said spray, and continuously conveying the coated feed material in contact with the atmosphere until the coating is dried.

9. The method of making a feed product, comprising cutting up solid feed material, continuously centrifugally spraying a coating material comprising a blend of a plurality of molasses in a fine mist-like spray, continuously feeding the cut up feed material into said spray to coat the same, and agitating said feed material transversely of the direction of feeding thereof while in said spray.

10. The method of making a feed product, comprising continuously centrifugally whirling a coating material comprising molasses in a chamber, continuously discharging and distributing said coating material from said chamber in a fine mist-like spray radially of said whirl, continuously feeding particles of solid feed material into said spray substantially perpendicular to the axis of said whirl to coat the same, and agitating said feed material in the general direction of the axis of said whirl while in said spray.

11. The method of making a coated product, comprising continuously centrifugally whirling a coating material comprising a blend of mobile materials in a chamber, continuously discharging and distributing said coating material from said chamber in a fine mist-like spray, continuously feeding particles of solid material into said spray to coat the same, and agitating said particles of said solid material transversely of the direction of feeding thereof while in said spray.

12. The method of making a coated product, comprising continuously centrifugally whirling a mobile coating material in a chamber, continuously discharging said coating material from said chamber in a fine mist-like spray, continuously feeding particles of solid material into said spray to coat the same, and agitating said solid material transversely of the direction of feeding thereof while in said spray.

13. The method of making a feed product, comprising continuously centrifugally whirling a coating material comprising molasses in a chamber, simultaneously continuously cutting up green feed material into pieces short enough that the same will not wind up on a rotating member, continuously centrifugally discharging said coating material from said chamber in a fine mist-like spray, continuously feeding the freshly cut up green feed material into said spray to coat the same and agitating said feed material transversely of the direction of said spray and the direction of feed while in said spray.

HERMANN HENRY SCHMIDT.